(12) United States Patent
Cantenot et al.

(10) Patent No.: US 8,265,032 B2
(45) Date of Patent: Sep. 11, 2012

(54) METHOD AND SYSTEM FOR MULTICAST BROADCASTING TOWARDS A ROAMING TERMINAL ACCORDING TO THE LOCATION THEREOF

(75) Inventors: Noël Cantenot, Palaiseau (FR); Luc Beloeil, Delivrande (FR); Sébastien Auvray, Issy les Moulineaux (FR)

(73) Assignee: France Telecom, Paris (FR)

( * ) Notice: Subject to any disclaimer, the term of this patent is extended or adjusted under 35 U.S.C. 154(b) by 1492 days.

(21) Appl. No.: 10/582,511

(22) PCT Filed: Nov. 25, 2004

(86) PCT No.: PCT/FR2004/003026
§ 371 (c)(1),
(2), (4) Date: Sep. 8, 2006

(87) PCT Pub. No.: WO2005/067201
PCT Pub. Date: Jul. 21, 2005

(65) Prior Publication Data
US 2007/0127471 A1 Jun. 7, 2007

(30) Foreign Application Priority Data

Dec. 12, 2003 (FR) .................................. 03 14639

(51) Int. Cl.
*H04W 4/00* (2009.01)
*H04L 12/28* (2006.01)
*G06F 15/16* (2006.01)
(52) U.S. Cl. ..................... 370/331; 370/390; 455/432.1; 709/229

(58) Field of Classification Search ................... 370/390
See application file for complete search history.

(56) References Cited

U.S. PATENT DOCUMENTS 6,647,020 B1 * 11/2003 Maher et al. .................. 370/432
6,741,575 B1 * 5/2004 Zhang et al. .................. 370/329
(Continued)

FOREIGN PATENT DOCUMENTS

EP 1 289 223 A2 3/2003
(Continued)

OTHER PUBLICATIONS

Meyer D: "Request for Comments 2365: Administratively Scoped IP Multicast", IETF Standards, 'Online !, Jul. 1, 1998, pp. 1-9, XP002274123, Internet, Retrieved from the Internet: URL: http://www.faqs.org/rfcs/rfc236_5.html>'retrieved on Mar. 17, 2004!, cited in the application, the whole document.

*Primary Examiner* — Andrew Chriss
(74) *Attorney, Agent, or Firm* — Young & Thompson

(57) ABSTRACT

Method and system for multicast broadcasting towards a roaming terminal according to the location thereof in relation to its site and/or original organization. Upon connection of the roaming terminal and transmission towards the site of a signalling message, it is possible to discriminate at the site an item of locating information of the roaming terminal whereby the latter receives a signalling acknowledgement message containing the locating information. When a request is made by the roaming terminal for access to group multicast broadcasting, involving a request for an address, the request is substituted or not by an extended multicast broadcast request according to the location of the connection of the roaming terminal, whereby the new address makes it possible to receive all local broadcasting at the site and/or at the original.

12 Claims, 8 Drawing Sheets

U.S. PATENT DOCUMENTS

| | | | |
|---|---|---|---|
| 6,765,892 B1 * | 7/2004 | Leung et al. | 370/332 |
| 6,988,146 B1 * | 1/2006 | Magret et al. | 709/238 |
| 7,346,053 B1 * | 3/2008 | Leung et al. | 370/390 |
| 7,609,668 B1 * | 10/2009 | Smith | 370/328 |
| 7,673,136 B2 * | 3/2010 | Stewart | 713/163 |
| 2002/0010782 A1 * | 1/2002 | Hoebeke et al. | 709/227 |
| 2002/0080767 A1 * | 6/2002 | Lee | 370/349 |
| 2003/0012180 A1 | 1/2003 | Donahue et al. | |
| 2004/0190542 A1 * | 9/2004 | Ono et al. | 370/432 |
| 2004/0264463 A1 * | 12/2004 | Fukushima et al. | 370/390 |
| 2005/0213545 A1 * | 9/2005 | Choyi et al. | 370/338 |

FOREIGN PATENT DOCUMENTS

| | | |
|---|---|---|
| EP | 1 303 107 A2 | 4/2003 |
| WO | WO 00/51373 | 8/2000 |

* cited by examiner

METHOD AND SYSTEM FOR MULTICAST BROADCASTING TOWARDS A ROAMING TERMINAL ACCORDING TO THE LOCATION THEREOF

FIELD OF THE INVENTION

The invention relates to a method and a system of multicast broadcasting to a roaming terminal according to the location of the IP network connection of the latter, and the corresponding software product or products.

BACKGROUND OF THE INVENTION

Currently, businesses or industrial or commercial companies use, as a quasi-necessity, the interchange of data and information supported by this data, via the IP network.

More widely, these businesses or companies are multi-establishment organizations, with one or more establishments normally being associated with at least one computer site, or web site, these sites being interlinked via an IP network. These businesses or companies are therefore also multisite entities, forming one and the same original organization.

As a general rule, the IP multicast information broadcasting method is used for broadcasting information to each of the abovementioned sites.

There are in fact three types of multicast broadcast defined in the RFC 2365 standard (administratively scoped IP multicast):

- broadcasts private to the site, also designated broadcasts local to the site, performed only to terminals affiliated to and managed by the original site, via an original home network, these local broadcasts never being transmitted from one site to another even though the latter are affiliated to the same original organization;
- broadcasts private to the original organization, typically the business, also called broadcasts local to the organization, performed only to terminals affiliated to the original organization, these broadcasts local to the organization never being transmitted to an organization external to the original organization;
- global broadcasts, these broadcasts being able to be broadcast to all the INTERNET and therefore accessible from any local IP network or access point connected to the latter.

A review of the multicast broadcasting technique will first of all be given in conjunction with FIGS. 1a and 1b.

In the case of the multicast broadcasting technique, with reference to FIGS. 1a and 1b, a receiver, $R_6$, wishing to have access or subscribe to a multicast broadcast sends an access request to its access router $RO_6$, according to the IGMP method (RFC 2236). The access router $RO_6$ uses a multicast routing protocol, the PIM-SM method (RFC 2117) for example, to relay this request to the point of the network (switching point or router) that is already receiving this broadcast, where appropriate, directly to the access router $RO_0$ of the broadcasting source, as represented in FIG. 1a. The routing of the abovementioned request is represented by solid line arrows in FIG. 1a.

Each router belonging on the route keeps in memory the software interface, routing data and addresses, via which it has received a request to subscribe to a predetermined broadcast. When the router concerned receives the IP data packets relating to this broadcast, it transmits them to its neighboring router by reverse path, using the stored software interface.

Thus, the IP data packets corresponding to this broadcast reach the requesting receiver $R_6$ by reverse path. The reverse path is represented by broken line arrows in FIG. 1a.

When a new receiver, the receiver $R_1$ for example, as represented in FIG. 1a, wants to access this same broadcast, it sends its access request to its access router $RO_4$. The latter transmits this request until it reaches a router executing the requested broadcast, in this case the router $RO_2$ in FIG. 1a. The path of this request is represented by mixed line arrows in FIG. 1a.

The most forward router, in the direction of the broadcast, reached by this request, which is already receiving the data and information of the broadcast requested by the receiver $R_1$, stops returning this request to the broadcasting source, server SD, duplicates the IP data packets to transmit the latter also to the receiver $R_1$ using the stored software interface, by reverse path. The path of the full broadcast is represented by broken line arrows in FIG. 1a, the reverse path $RO_2$-$RO_3$-$RO_4$-$R_1$ being represented by a double broken line arrow in FIG. 1a, although belonging to the same multicast broadcast as that requested by the receiver $R_6$. The same applies for any receiver $R_2$ to $R_5$ likely to request this same broadcast.

Consequently, with the IP multicast broadcast technique, it will be understood that the server SD sends the data supporting the information that makes up the broadcast only once. This data is duplicated by the routers of the network dynamically, to reach the authorized receivers that have made the request. The set of paths or routes followed by the IP data packets of the broadcast, from the server SD to these authorized receivers, forms a multicast information broadcasting tree, the root of which is the broadcasting source, server SD or root router $RO_0$, the various routes forming the branches and the end receivers forming the leaves. It should be understood, in particular, that, following the access request from the receivers $R_6$ and $R_1$, in the case of an access request from the receiver $R_4$, the branch $RO_2$-$RO_9$ and the receiving leaf $R_4$ are added whereas in the case of an access request from the receiver $R_2$, only the receiving leaf $R_2$ is added.

As for the IP multicast addressing, the multicast broadcasting technique introduces the concept of multicast broadcast. An IP data packet that is part of a multicast broadcast has a destination IP address, called multicast address. All the data packets supporting information belonging to the same broadcast have the same destination multicast address. Whereas a unicast IP address can be used to identify just one receiving machine or workstation, a multicast IP address is used to identify a set or group of machines, the set of machines authorized to access this broadcast. A multicast address is therefore always a destination address and would be meaningless as a source address. To this end, a part of the IP address codes is reserved for assigning multicast addresses.

Specifically, the standard RFC 2365 (Administratively Scoped IP Multicast) defines a way of assigning certain multicast addresses an administrative limit to the broadcast that these addresses represent.

Depending on the value of the multicast address assigned to a broadcast, this broadcast is consequently intended, as mentioned previously, to be limited:

to a site (site-local scope);
to an organization (organization-local scope);
to all the Internet (global scope).

The possibilities offered by the abovementioned multicast broadcast concept for broadcasting data to the different sites of a business or multisite entity appear currently to be significantly limited.

If, with reference to FIG. 1b, we consider a multisite entity located on four separate sites, site 1, site 2, site 3 and site 4, site 1 including, for example, a multicast broadcast server SD, such a broadcast, according to a "site-local scope" mode, is local to site 1. Consequently, the IP data packets supporting the information of this broadcast are not sent outside of the site. These data packets therefore do not cross the interconnecting network and cannot be received by the users of other sites, site 2, site 3 and site 4.

The abovementioned different broadcast types have a very significant impact on the access restrictions affecting any roaming terminal affiliated to an original organization, according to the location of the network, local IP network and/or INTERNET, to which the latter is connected.

Discriminating the location of the connection of any roaming terminal affiliated to an original organization, such as a multisite business, is therefore crucial, in order to implement a specific selective broadcasting method towards a roaming terminal, such a broadcast needing, in particular, to be totally selective, of the point-to-point broadcast type, when this roaming terminal is connected to a network outside its original organization, and, more often than not, when this same roaming terminal, although connected to a site affiliated to its original organization, is not connected to its original site.

These situations are represented in FIG. 1*c*, for a roaming terminal T network-connected to its original site $S_1$, to sites $S_2$ and $S_3$ separate from the original site $S_1$ but affiliated to the original organization $O_0$ and to any site $S_p$ affiliated to an organization $O_p$ separate from the original organization $O_0$, the terminal being denoted $T_1$, $T_2$, $T_3$ and $T_p$ successively.

In the abovementioned situations, this roaming terminal can be reached only by the global broadcasts, or the global broadcasts and broadcasts local to the original site.

In practice, some IP network services use the concept of hierarchy of the IP network architecture. These services can limit their network scope to a link, a site, an organization, or even extend this scope to all of the INTERNET.

In these conditions, it is essential for a terminal that is on the move to be able to determine if it is connected to its original home network, to another site affiliated to its original organization or to another site external to the latter.

The location of this connection is in fact likely to modify the recognized capabilities of this terminal that is on the move to access the services of the IP network for which the access is restricted by the original organization of the latter, such as its business.

At the present time, the techniques for locating the connection of a roaming terminal that is on the move do not allow for this terminal to be informed of its location, in particular the location of its network connection either on its original site, or on another site separate from its original site but affiliated to its original organization, or even to a site affiliated to an organization separate from its original organization, or directly to the INTERNET.

Among the solutions currently available for locating terminals connected to the IP network, only partial solutions have been proposed.

The abovementioned partial solutions mainly consist of neighbor terminal discovery and error management protocols, such as are defined by the IETF (The Internet Engineering Task Force), by the documents:
RFC 2461 (Neighbour Discovery for IP Version 6) for the IP protocol, version 6, IPv6;
RFC 1256 (ICMP Router Discovery Messages) for the IP protocol, version 4, IPv4;
by the dynamic IP address allocation protocols:
RFC 2131 (Dynamic Host Configuration Protocol) for the IPv4 protocol;
RFC 3315 (Dynamic Host Configuration Protocol for IPv6, (DHCPv6));
by the documents specifying the IP addressing architectures used by the abovementioned protocols:
RFC 3513 (IPv6 Addressing Architecture) IPv6;
RFC 2365 (Administratively Scoped IP Multicast, RFC 1918 (Address Allocation for Private Internets), RFC 3232 (Assigned Numbers: RFC 1700 is replaced by an Online Database) for IPv4;
by a document submitted to the IETF, which proposes a solution enabling a terminal of the IP network to distinguish the IPv6 prefix of its organization:
draft-zill-ipv6wg-zone-prefixlen-oo.txt (Organization Zone Prefix Length Discovery).

The solutions for terminal mobility management within IP networks are defined by the following IETF documents (www.ietf.org):
RFC 3344 (IP Mobility support for IPv4) for IPv4;
draft-ietf-mobileip-ipv6-20.txt for IPv6.

The solutions for terminal mobility management within IP networks using an AAA "Authentication, Authorization, Accounting" infrastructure are defined by the following IETF documents (www.ietf.org):
Protocol Diameter: draft-ietf-aaa-diameter-17.txt
Application Mobile IPv4: draft-ietf-aaa-diameter-mobileip-13.txt;
Application Mobile IPv6: draft-le-aaa-diameter-mobileipv6-0.3.txt.

The prior arts implementing the abovementioned solutions to support the movement of a roaming terminal present many drawbacks, due to unresolved operational problems.

All the fixed or roaming terminals connected to the same link, affiliated to the same original home network, forming a local area network for example, have an IP address with the same prefix, but different suffixes.

According to the IPv4 protocol, an IP address is encoded on 32 bits. The length of the prefix used to describe a network address is variable, from 1 to 30 bits. A part of the IPv4 addressing space, a set of addresses, is reserved for the "unicast" addresses, in accordance with the IETF document: RFC 3232. The term "unicast" denotes all of the "Unicast" and "Global Unicast" addresses.

According to the IPv6 protocol, an IP address is encoded on 128 bits. The length of the suffix of a "unicast" address is set at 64 bits, except for specific IPv6 addresses which begin with the word "000", the use of which is highly regulated. A part of the IPv6 addressing space, a set of addresses, is reserved for the "unicast" addresses, in accordance with the IETF document: RFC 3513.

When a roaming terminal that is on the move connects to a receiving IP network that is separate from its original home network, there are currently three protocols that allow such a terminal to acquire an IP address enabling it to be integrated into the receiving IP network.

A first protocol, designated DHCP, for "Dynamic Host Configuration Protocol", can be implemented within the framework of the abovementioned IPv4 and IPv6 protocols. It allows an IP terminal to ask an address server to allocate it an IP address from a pool, or set of addresses, that is specific to it for a period of time negotiated between the roaming terminal, the client, and the address server. On such an allocation, the requesting IP terminal also detects the prefix of the link to which it is connected. The series of IPv4 and IPv6 protocols defines a protocol called DHCPv4, or respectively DHCPv6, based on a dynamic allocation mechanism. The latter provides good flexibility in terms of configuration and makes it possible to allocate a client terminal an IP address and other configuration parameters in the network such as DNS (Domain Name System) address, as per documents RFC 1034 and 1035 published by the IETF, for routers, servers, gateways and the like.

A second protocol is an integral part of the "Mobile IP" protocols. In the context of the abovementioned IPv4 and IPv6 protocols, the corresponding versions of this second protocol are compatible with the use of the DHCP protocol, but use a different mode, better suited to the mobility of the roaming terminals within different IP networks. In both the abovementioned versions, this second protocol relies on the fact that the routers of the IP networks periodically transmit announcement messages, in particular in the IPv6 version, describing the prefix of the original home or receiving IP networks to which the fixed or roaming terminals are connected.

A roaming terminal on the move then uses these announcement messages to detect the prefix of the IP network to which it is connected, and uses it to self-generate and be assigned a unique, coherent "unicast" address. In the IPv4 version, however, the abovementioned periodic announcement messages can directly announce the complete "unicast" address which can be used by the roaming terminal on the move. This address is an address assigned to a router, managed by the latter, and can be used by a roaming terminal on the move when the procedures described in the Mobile IP protocol (for IPv4) are followed.

In the context of this second protocol, a fixed or roaming terminal has a fixed IP address, configured specifically in the terminal. This fixed IP address is part of the original home network of the terminal and constitutes a coherent address with the prefix of the original home link of the terminal, original home link and therefore network to which the roaming terminal is connected, when the latter is not on the move.

In the context of the "Mobile IP" protocols, a roaming terminal on the move always remains in contact with its original home network. To this end, there is provided, installed on the latter, a software agent called "Home Agent", HA. When the roaming terminal on the move has acquired a new IP address that is different, and therefore unknown, to those that are part of its original home network, it then registers with its software agent HA by communicating to it the IP address that is newly acquired and that it will use from now on to communicate. Thus, the software agent HA still knows the IP address that it must use to enter into contact with the roaming terminal on the move.

A third protocol is also implemented mainly by the IP network access control protocols.

The access control protocols are used between the roaming terminal on the move and the first IP router of the receiving IP network, also called access router.

The access control protocol used between the access router and an access control server is normally the RADIUS protocol or a more recent development of the latter, the DIAMETER protocol.

Among the parameters conveyed by the DIAMETER and RADIUS protocols, there is one that specifies the IP address to be assigned to the roaming terminal on the move requesting access. This IP address is then transmitted to the terminal by the access control protocol.

In this type of architecture, an access control server affiliated to the original home network of the roaming terminal and implementing the DIAMETER protocol, this server also being designated AAAH, for "Authentication, Authorization, Accounting Home" server, is configured to handle the authentication and access authorization of the roaming terminal on the move.

Thus, the AAAH server is always notified when one of the terminals that it manages tries to connect to the IP network and can even, depending on the case, propose the IP address to be assigned to it.

The advantage of the DIAMETER protocol is that this protocol proposes a distributed architecture of access control servers, which makes it possible to control access to terminals via local area networks managed by separate organizations. When being allocated its new IP address, the roaming terminal on the move also detects the prefix of the link to which it is connected.

The drawbacks, due to inadequacies, of the abovementioned three current protocols can be summarized as follows.

The DHCP protocol, in addition to the address that it allows to be allocated to a terminal, is capable of providing other network configuration parameters to the latter. The main parameters are the network mask, the validity time granted to the new address, the default network gateway address, address of an access provider or an ISP (for "International Standard Profile") via which the terminal will access the IP network, and the identifier of the client and the name of the server to be used.

However, it cannot compensate for the addressing-related problems inherent to the IPv4 protocol and its breakdown into sites and organizations.

In particular, the structure of the addresses and the terminal/router dialogs do not in any way allow the terminals to determine:
  when an address is allocated to the IP terminal on the move;
  whether it is connected to another link affiliated to its original site;
  whether it is connected to a link from another site affiliated to its original organization;
  whether it is connected to a link not affiliated to its organization;
  whether the addresses cover a number of sites of one and the same business or a number of different businesses that can use the same network address prefixes.

With the second protocol being an integral part of the "Mobile IP" protocols, when a terminal acquires a new IP address, this terminal can only determine the prefix of the subnetwork, such as a local area network, to which the new IP address that has been acquired belongs, and compare it to the prefix of its fixed address.

While it can make it possible to detect whether the roaming terminal is connected to its original link, on the negative side, it cannot in any way make it possible to determine whether the roaming terminal is connected:
  to another link affiliated to its original site;
  to a link affiliated to a site of its original organization;
  to a link not affiliated to its organization.

Furthermore, the second abovementioned protocol does not necessarily allow the roaming terminal to detect whether it is connected to its original home network. Such is in particular the case when there are overlapping addressing plans, that is, when a number of sites of one and the same business or several different businesses use the same network prefixes.

In these conditions, if the roaming terminal connects to an IP network using the same prefix as its original home network, in the absence of possible discrimination, this roaming terminal will, wrongly, believe it is connected to the latter.

Finally, when a roaming terminal on the move transmits IP data packets outside the site to which it is connected, a translation of the source address of the packets may be performed, for example in the case of overlapping addressing plans or if the sites of the organization are linked via the INTERNET. In these conditions, the roaming terminal on the move is therefore no longer accessible from the outside by its address acquired dynamically, but by its translated address. It will be remembered that, for any site to which a roaming terminal is connected, the interior denotes, in fact, all the networks and IP nodes that are interconnected and that are identifiable by all the private and public IP addresses of the organization to which the abovementioned any site belongs. The exterior denotes all the IP networks and nodes that cannot be identified from the abovementioned addresses.

In the case of the third protocol, the use of an access control protocol based on a DIAMETER type architecture results in the roaming terminal on the move having only a fixed identifier called NAI (Network Access Identifier), which makes it possible, among other things, to determine the AAAH server to be interrogated to request access. Furthermore, the roaming terminal does not know the IP address of the AAAH server affiliated to its original home network. Thus, when an address is assigned to the roaming terminal on the move, the latter cannot in any case determine if it is connected:

to another link affiliated to its original site;
to a link affiliated to another site of its original organization;
to a link not affiliated to its original organization.

Besides the lapses relating to the inadequacies inherent in the location of the abovementioned protocols, the transmission of a multicast broadcast that is local to a site to another site, even if this site and this other site belong to one and the same original organization, is not possible.

Thus, when a roaming terminal on the move requests access to a broadcast identified by the multicast group address, it simply transmits an access request using the IGMP protocol, specifying the address for which it wants to receive the stream.

Such a method does not therefore make it possible, in any case, to take into account the location of the connection of the roaming terminal in order to transmit broadcasts local to the original site and/or organization, for which access is therefore restricted by this location.

SUMMARY OF THE INVENTION

The object of the present invention is to remedy all of the drawbacks of the techniques and processes of the prior art, in order to make it possible to ensure the transmission of any type of broadcast local to the original site and/or organization to which the roaming terminal is affiliated in the absence of any limitation given the location of the network connection of the latter with respect to that original site and/or organization.

One object of the present invention is in particular to implement a method of multicast broadcasting to a roaming terminal, making it possible to combine a location process of this roaming terminal and an extended multicast broadcast process that are specific, an extended multicast broadcast process whereby a broadcast local to an original site and/or an organization is made accessible via a global multicast broadcast.

In particular, an object of the abovementioned combination is to jointly implement a unique location process for any roaming terminal, making it possible to create and transmit to the latter a location discriminating information item, with respect to the original site and/or organization to which this roaming terminal is affiliated, and a unique extended multicast broadcast process which, depending on this location discriminating information item, makes it possible to replace any multicast broadcast local to the original site and/or organization to which this roaming terminal is affiliated with a global multicast broadcast allowing access to the latter by this roaming terminal, when the latter is connected outside its original site and/or organization, in the absence of access to this local multicast broadcast.

The method of multicast broadcasting to a roaming terminal according to the IP network connection of the latter, the subject of the present invention, is noteworthy in that, following a routine connection of this roaming terminal to a site affiliated or not affiliated to the original site and/or organization to which this roaming terminal is attached and the transmission of a message requesting registration of this roaming terminal to the original site, this method consists in at least, on this original site, discriminating the location of this roaming terminal with respect to its original site, or its original organization, from this registration message, and transmitting to the roaming terminal a location discriminating information item and, on this roaming terminal, for any request to access a group multicast broadcast intended for the original site and relating to a multicast broadcast local to the original site, or to the original organization, of this roaming terminal, replacing this access request, when this location information designates a connection of this roaming terminal outside its original site, or its original organization, with a request to access an extended multicast broadcast allowing access to said local multicast broadcast and transmitting, to the original site, the request to access this extended multicast broadcast.

The system of multicast broadcasting to a roaming terminal according to the IP network connection of the latter, the subject of the present invention, is noteworthy in that, following a routine connection of this roaming terminal to a site affiliated or not affiliated to the original site and/or organization to which this roaming terminal is attached and the transmission of a signaling message from this roaming terminal to this original site, this system comprises at least, on the original site, a module for discriminating the location of this roaming terminal with respect to its original site, or its original organization, from this signaling message, and a module for transmitting to this roaming terminal a location discriminating information item, and, on this roaming terminal, for any request from this roaming terminal to access a group multicast broadcast intended for the original site and relating to a multicast broadcast local to the original site, or to the original organization, of this roaming terminal, a module for replacing this access request, when this location discriminating information item designates a connection of this roaming terminal outside its original site, or its original organization, with a request to access an extended multicast broadcast allowing access to this local multicast broadcast and a module for transmitting to the original site this request to access this extended multicast broadcast.

The method and the system of multicast broadcasting that are the subjects of the present invention find application in any type of IP network, in particular local area networks, wide area networks, the INTERNET, and so on.

BRIEF DESCRIPTION OF THE DRAWINGS

They will be better understood from reading the description and studying the drawings below, in which, in addition to FIGS. 1a, 1b and 1c relating to the prior art.

FIG. 2b represents, by way of illustration, an implementation detail of the multicast broadcasting method that is the subject of the invention as represented in FIG. 2a;

FIG. 3b represents, by way of illustration, a specific method of implementing the comparison process used by the unique location process, according to FIG. 3a;

DETAILED DESCRIPTION OF EMBODIMENTS

A more detailed description of the method of multicast broadcasting to a roaming terminal, according to the location of the IP network connection of the latter, in accordance with the subject of the invention, will now be given in conjunction with FIG. 2a.

With reference to the abovementioned figure, consideration is given to a roaming terminal T affiliated to an original site $S_1$ and, of course, an original organization $O_0$, this roaming terminal being brought, by the movement of the user U of the latter, to any site $S_x$ and to connect to the abovementioned any site $S_x$.

It should be indicated generally, that the any site $S_x$ is or is not affiliated to the original site and/or organization to which the roaming terminal T is attached.

Figure 2A:
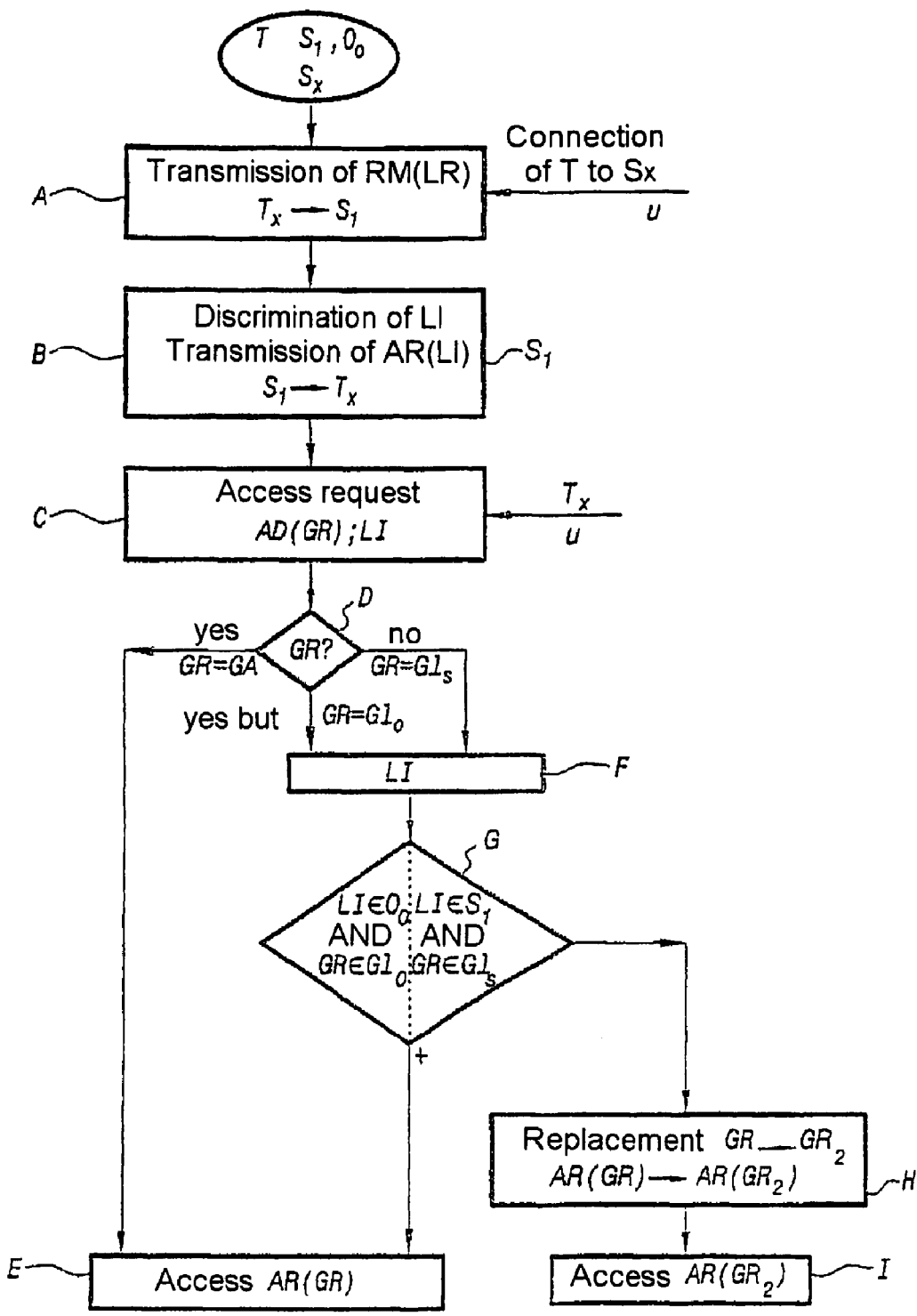
FIG. 2a represents, by way of illustration, a flow diagram of the essential steps for implementing the multicast broadcasting method that is the subject of the present invention.

With reference to FIG. 2a, the step A for connecting the roaming terminal to the site $S_x$ is shown due to the initiative of the user U, the terminal T then taking the reference $T_x$ purely because of the connection of this terminal to the abovementioned any site $S_x$.

Purely because of this connection, and conventionally, the duly connected roaming terminal $T_x$ is able to transmit, if necessary, a signaling request message from this roaming terminal to the original site $S_1$, this signaling message being denoted RM(LR). Such a message is not necessary when the roaming terminal is connected to its original link or subnetwork.

As a nonlimiting example, it is indicated that, in the abovementioned signaling message, the parameter LR designates a location reference formed, for example, by an IP address allocated by the site receiving the roaming terminal $T_x$, that is, the any site $S_x$, in particular by the administrator of the abovementioned any site $S_x$.

Following the transmission of the signaling message RM(LR), the method that is the subject of the invention consists, on the original site $S_1$, and following the receipt of this signaling message, in a step B, in discriminating the location of the roaming terminal $T_x$, with respect to its original site $S_1$, or its original organization $O_0$, from the abovementioned signaling message, the discrimination extending to the creation of a location discriminating information item LI, as will be described later in the description.

The step consisting in discriminating is then followed by a step consisting in transmitting to the roaming terminal $T_x$ the abovementioned location discriminating information item LI, in order for the latter to be able to use the discriminated location information.

The abovementioned step B is then followed, on the roaming terminal $T_x$, for any request from the roaming terminal to access a group multicast broadcast intended for the original site $S_1$ and relating to a multicast broadcast local to the original site, or to the original organization, of the roaming terminal, the access request being denoted AD(GR), GR in fact designating the group multicast broadcast address in the original site, in replacing, in the steps D, F, G, H as represented in FIG. 2a, the access request AD(GR) with a request to access an extended multicast broadcast, when, on the one hand, the access request AD(GR) relates to a multicast broadcast local to the original site $S_1$, or the original organization $O_0$, of the roaming terminal and, on the other hand, the location discriminating information item LI designates a connection of the roaming terminal outside its original site $S_1$, or its original organization $O_0$.

It will be understood in particular that, with the abovementioned replacement, any access request relating to a multicast broadcast local to the original site, or to the original organization, of the roaming terminal, cannot be accessed from any site $S_x$ connecting the roaming terminal outside its original site, or outside its original organization, but that, however, the request to access an extended multicast broadcast allows access to the multicast broadcast local to the original site, or to the original organization, from the roaming terminal concerned.

The abovementioned replacement step is then followed by a step F consisting in transmitting to the original site the request to access the extended multicast broadcast as will be described later in the description.

In particular, it is indicated that the request to access the extended multicast broadcast is denoted AR($GR_2$), the abovementioned replacement operation consisting, as will be described in more detail later in the description, in replacing the address GR requesting access to a group multicast broadcast with an extended multicast broadcast address $GR_2$ making it possible to provide a similar data broadcast.

In a first embodiment of the method that is the subject of the present invention, it is indicated that the abovementioned replacement operation can be managed as represented in FIG. 2a.

Following the step C of the access request generated by the roaming terminal Tx solely on the initiative of the user U, the replacement operation can consist in performing a test D to discriminate the address GR of the request to access a group multicast broadcast, the test of the step D consisting in discriminating whether the abovementioned address GR is a global address GA, a group address local to the organization $GI_0$ or even a group address local to the site $GI_s$.

To implement the test of the step D, it is indicated that the value of the address G of the request to access a group multicast broadcast is simply discriminated as a value relative to a law for creating values for global access addresses GA, group addresses local to the organization $GI_0$, or group addresses local to the site $GI_s$.

It is indicated, by way of nonlimiting example, that the global addresses GA, local to the organization $GI_0$, or to the site $GI_s$ can, by way of nonlimiting example, correspond to values of addresses assigned by the administrator of the original site $S_1$ from unconnected ranges of values in order to perform a simple discrimination by comparison.

On a positive response that the address GR of the access request belongs to the set of global addresses GA, this positive address being denoted "yes" in FIG. 2a, the request to access a group multicast broadcast is then transmitted in a step E directly in the form of an access request denoted AR(GR), the group multicast broadcast request being accessible by the roaming terminal Tx independently of the location of its connection site because of the global nature of the multicast broadcast.

When the address GR of the group multicast broadcast request is not a global address, it corresponds either to a group multicast broadcast address local to the organization $GI_0$ or local to the site $GI_s$.

This situation is represented symbolically in the test D of FIG. 2a by the response "yes but" when the address GR is an address global to the organization $GI_0$ and by the response "no" when the address GR is, on the other hand, an address global to the site $GI_s$. In the two abovementioned situations represented by the "yes but" and "no" situations in response to the test D, the knowledge of the location of the connection or, more precisely, of the site of the roaming terminal $T_x$ on the any site $S_x$, is then necessary.

Consequently, the responses "yes but" and "no" to the test D are then followed by a call to the step F for the location information LI, which has been transmitted to the roaming terminal in the step B by the original site $S_1$.

The step F is then followed by a step G, the object of which is to discriminate whether the group multicast broadcast request address GR belongs to the set of global addresses local to the original organization when the roaming terminal is connected to a site separate from the original site but affiliated to the original organization $O_0$, or whether the group broadcast request address GR belongs to the set of group addresses local to the original site and the connection of the roaming terminal $T_x$ to the latter.

Consequently, the test of the step G is used to create the following logical relations:

$LI \in O_0$ AND $GR \in GI_0$;

$LI \in S_1$ AND $GR \in GI_s$.

On positive response to one or other of the abovementioned logical relations, the group multicast broadcast access request AD(GR) is then created in the form of a request to access this same address G in the form of request AR(GR) in the step E of FIG. 2a.

On the other hand, on a negative response to one or other of the logical relations of the test of the step G, a step H is invoked in order to enable the group multicast broadcast access request GR, which cannot be received on the any site $S_x$ to which the terminal $T_x$ is connected, to be replaced with an address $GR_2$ making it possible, on the other hand, to receive on the abovementioned site $S_x$ the abovementioned group multicast broadcast.

The step H is then followed by a step I consisting in transmitting the access request $AR(GR_2)$ in which the group multicast broadcast address has been replaced by a so-called extended multicast broadcast address $GR_2$ enabling, of course, access to the local multicast broadcast that cannot be accessed from the roaming terminal connected to the any site $S_x$.

The replacement procedure carried out in the step H will be described later in the description.

As a general rule, it will be observed in FIG. 2a that the location reference LR, on the one hand, and the group multicast broadcast request address GR, on the other hand, are, of course, independent variables left substantially to the judgment of the user U.

For this reason, it is, of course, possible to envisage reversing, where appropriate, the succession of the steps D, F and G, without departing from the framework of the object of the present invention, the discrimination of the affiliation of the location reference LI to the original organization, or to the original site, possibly being carried out prior to the discrimination of the value of the group multicast broadcast request address GR, for example.

Such a reversal will not be described, because it falls within the scope of those skilled in the art.

Figure 2B:
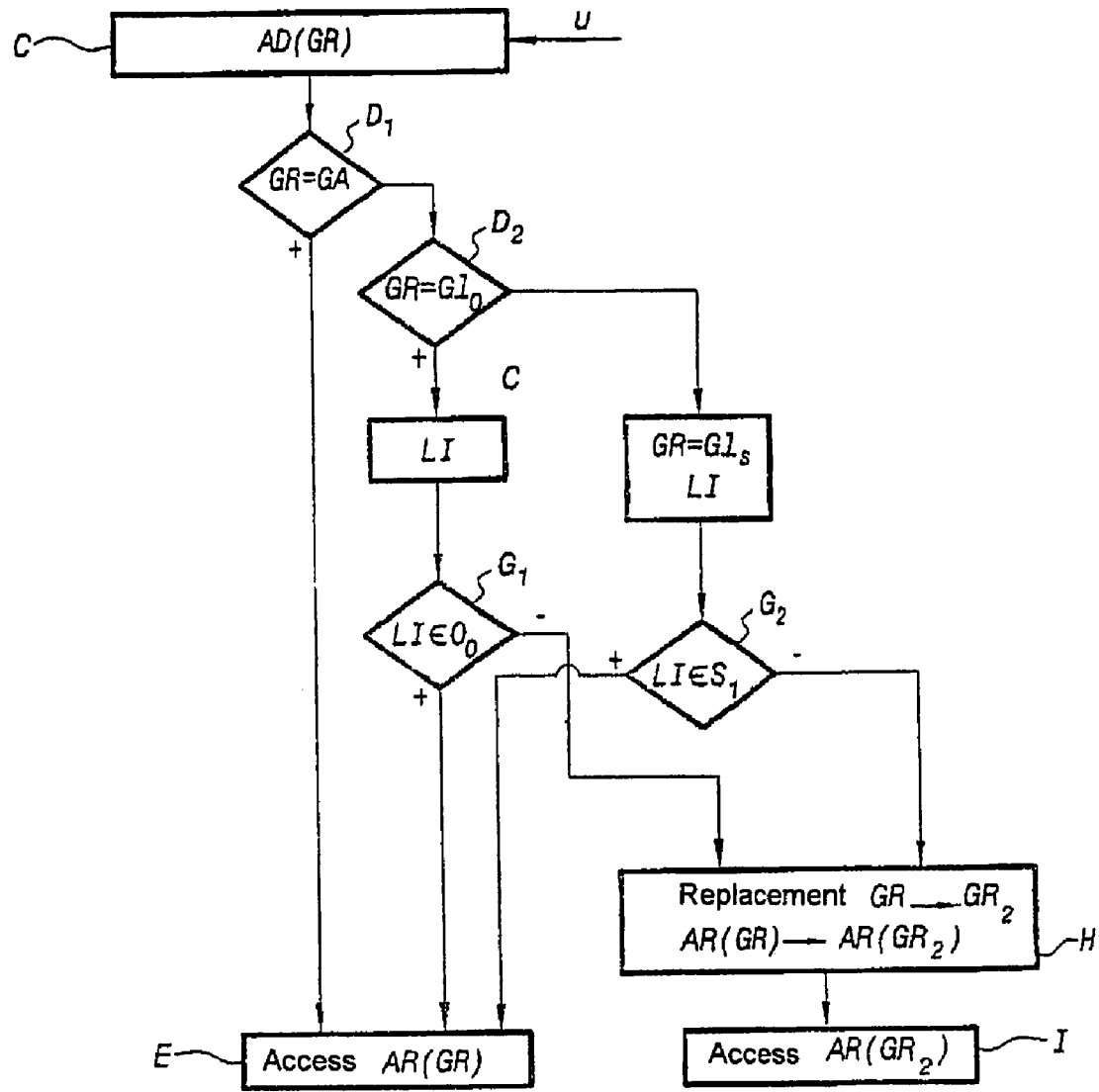

Regarding the implementation of the logical steps represented in steps D and G of FIG. 2a, these can be implemented as represented in FIG. 2b, the step D possibly being subdivided in fact into two successive tests $D_1$ and $D_2$, in which the group multicast broadcast address GR is successively compared to the set of group global addresses GA in the substep $D_1$, the negative response to the abovementioned substep making it possible to invoke the substep $D_2$ to test whether the group address GR belongs to the set of group addresses local to the organization $GI_0$. A positive response to the substep $D_2$ restores the situation of the response "yes but" of the step D in FIG. 2a and a negative response to the substep $D_2$ restores the situation of the negative response "no" to the test of the step D in FIG. 2a.

The step G of FIG. 2a can also be subdivided into two substeps $G_1$, or $G_2$, on affiliation of the location reference LI to the original organization $O_0$, or to the original site $S_1$.

The steps E, F, H and I are then invoked in the same way as in the case of FIG. 2a.

A more detailed description of a unique process for discriminating the connection site with respect to the original site and/or original multisite organization of a roaming terminal in accordance with the object of the present invention will now be given in conjunction with FIG. 1c, relating to the prior art, and FIGS. 3a and 3b.

Figure 1A:
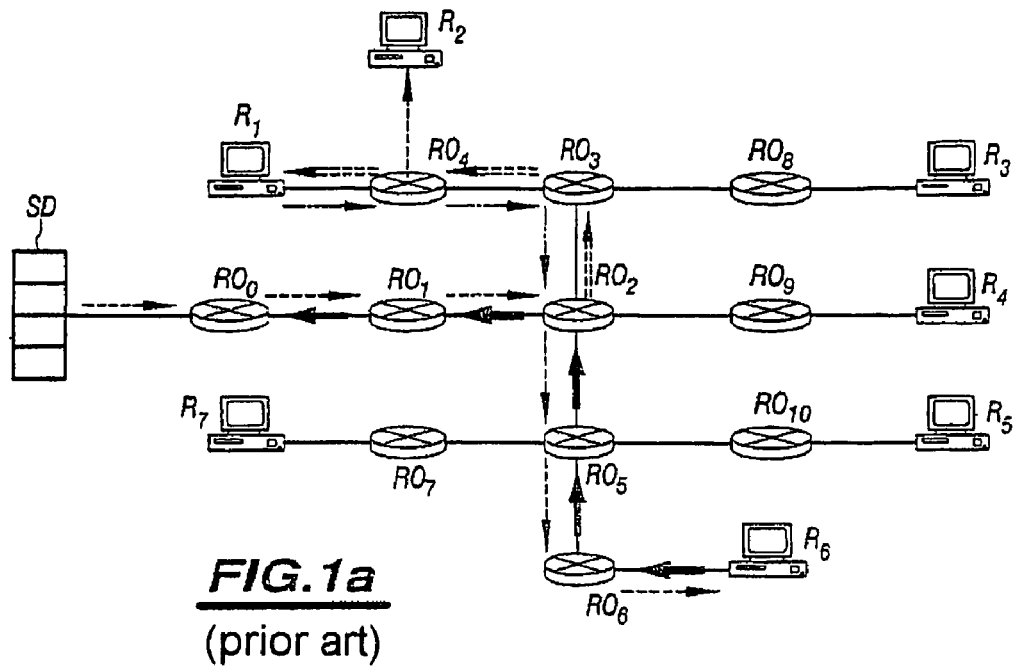
Figure 1B:
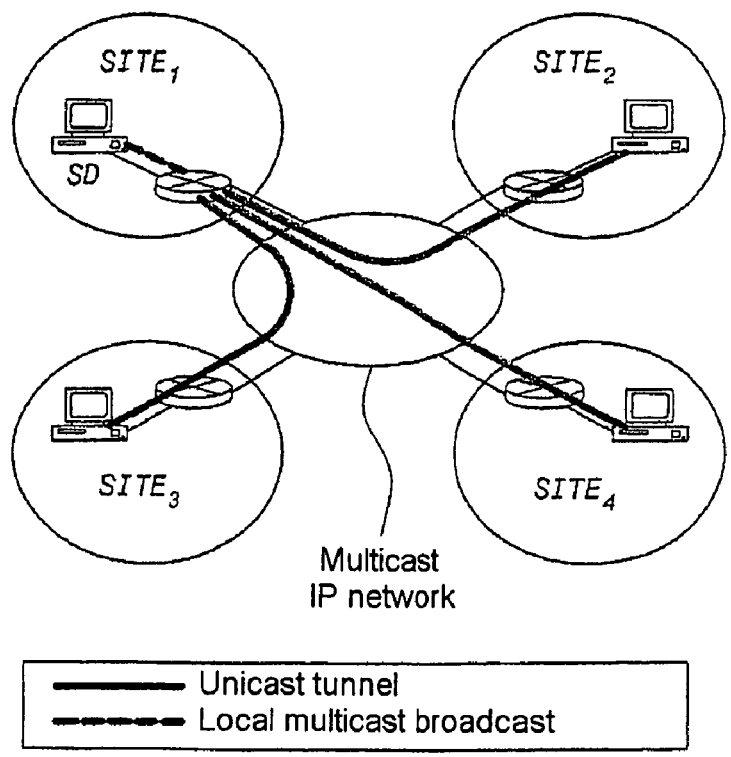
Figure 1C:
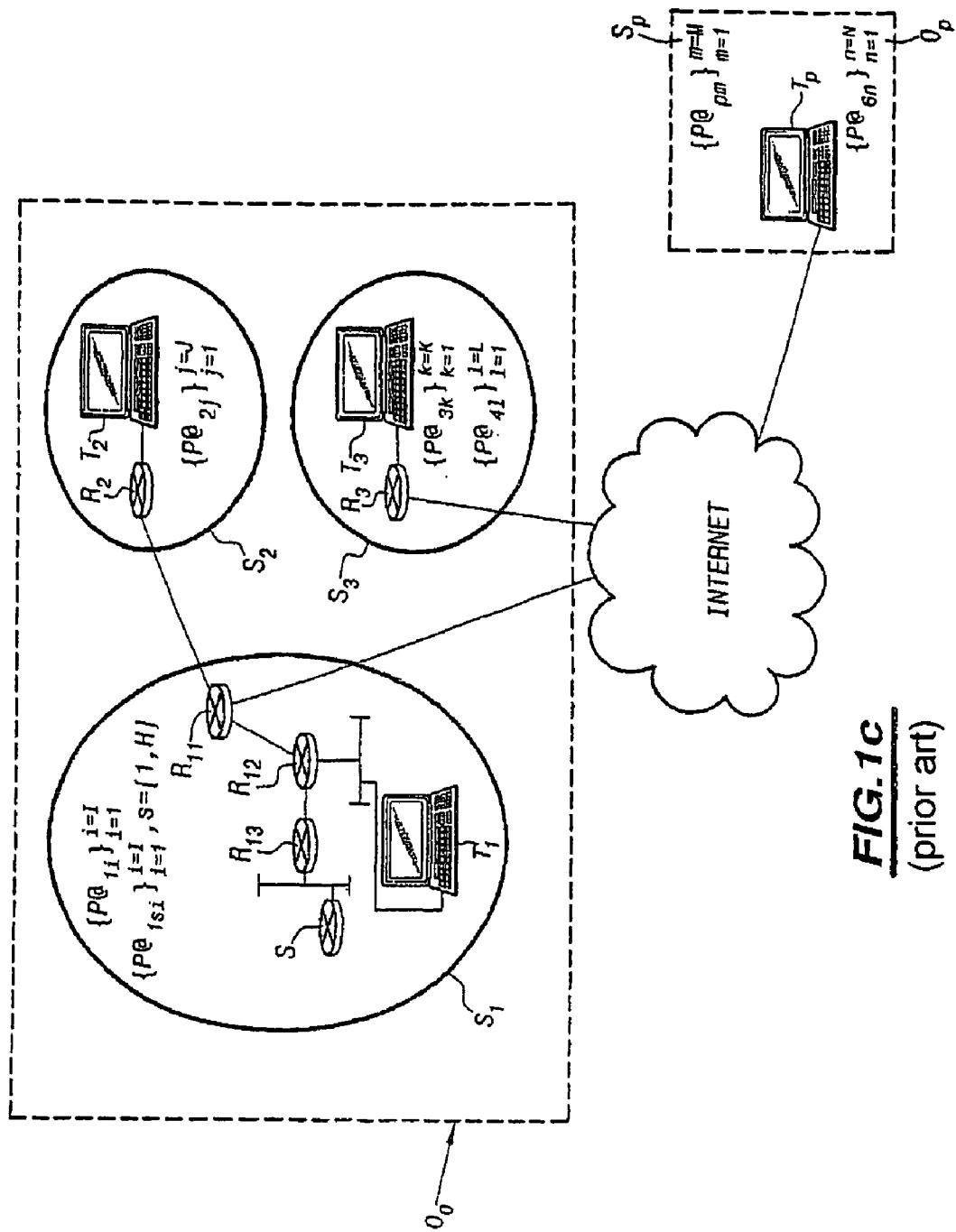

FIG. 1c represents an original multisite organization $O_0$ comprising, for example, three sites $S_1$, $S_2$, $S_3$, the site $S_1$ making up the original site corresponding to a local area network, for example of IP type, comprising a plurality of routers $R_{11}$, $R_{12}$ and $R_{13}$, and a server S for managing the abovementioned original multisite organization $O_0$.

The site $S_2$ is, for example, made up of an IP type local subnetwork linked to the local area network forming the original home network of the site $S_1$.

Finally, the site $S_3$ is a site affiliated to the original multisite organization $O_0$, the site $S_3$ being, however, linked to the original home network and to the site $S_1$ via the Internet for example.

A roaming terminal $T_1$ is thus liable to operate in its original home network, this terminal connected to the original site $S_1$ to which it is attached being referenced $T_1$ and connected to the router $R_{12}$ for example, and/or outside its original home network, this terminal then being denoted $T_2$ when it is connected to the local subnetwork forming the site $S_2$ via the router $R_2$.

The abovementioned roaming terminal can also be connected outside its original home network to the site $S_3$ affiliated to the original multisite organization $O_0$, but via the INTERNET, the abovementioned roaming terminal being denoted $T_3$ in this situation, and connected to the router $R_3$.

Finally, the abovementioned roaming terminal can be connected to any site denoted $S_p$ not affiliated to the original multisite organization $O_0$ but, on the other hand, to any multisite organization, denoted $O_p$, the abovementioned roaming terminal bearing the reference $T_p$ in this situation.

It will, of course, be understood, by way of nonlimiting example, that the abovementioned roaming terminal bearing the references $T_1$, $T_2$, $T_3$ and $T_p$ can be one and the same terminal on the move or even any separate roaming terminal likely to implement the method that is the object of the present invention.

As is represented in FIG. 1c, the roaming terminal $T_1$ is allocated, by the original home site and ultimately by the original home network, an internal permanent address denoted $P@_{1i}$ for any network connection of the roaming terminal $T_1$ to a site affiliated to this original home network.

Similarly, an internal temporary address is allocated to the roaming terminal referenced $T_2$ or $T_3$ for any network connection of the abovementioned roaming terminal to another site affiliated to the original multisite organization $O_0$. It will be understood, in particular, that the administrator of the IP network that forms the original multisite organization $O_0$ and ultimately, the administrator of the sites $S_1$, $S_2$ and $S_3$ is then able to allocate, when the roaming terminal in position $T_2$ is connected to the site $S_2$, an internal temporary address denoted $P@_{2j}$ or, on the other hand, an internal temporary address denoted $P@_{3k}$ or $P@_{4l}$ when the roaming terminal in position $T_3$ is connected to the site $S3$. It is indicated in particular that the distinction between the internal temporary addresses $P@_{3k}$ or $P@_{4l}$ corresponds respectively to a substantially arbitrary, so-called mobility temporary address allocated by the server center S, or to a translation address for example.

It will be remembered, in particular, that, in the case of a business, the administrator has a set of so-called private IP addresses, which can be used freely; any administrator of an IP network can also freely re-use these same IP addresses (IETF document RFC 1918). Furthermore, when this business wishes to communicate over the INTERNET, it must then use its globally unique IP addresses, unique in the world and therefore regardless of the network connected to the INTERNET. The globally unique addresses are called public and assigned either by the INTERNET service provider, or by a Regional Internet Registry (RIR) organization. More often than not, the businesses use a device between their network and the INTERNET which translates the private addresses into public addresses. In the method that is the object of the invention, the IP address assigned to the roaming terminal $T_x$ can be private and the datagrams used to reach the server S can, nevertheless, pass through an address translator via the INTERNET and therefore appear to come from a public address. Such a public address can, for example, be owned by the site $S_3$ of FIG. 1, or any other site.

Finally, when the roaming terminal is connected to any site, such as the site $S_p$ not affiliated to the original multisite organization but to another multisite organization $O_p$, then the address allocated to the terminal in position $T_p$ in FIG. 1 is designated $P@_{pm}$ and constitutes an external temporary address. $P@_{pm}$ designates a private address and $P@_{6n}$ designates a public address used in address translation of the abovementioned private address $P@_{pm}$.

It will be understood, in these conditions, that the concept of internal permanent and temporary address corresponds to the internal nature of the addresses allocated to the original multisite organization $O_0$, whereas the external nature of the temporary address, when the roaming terminal is connected to a site not affiliated to the original multisite organization, corresponds to the external nature of this address with respect to the abovementioned original multisite organization.

It will, of course, be understood that, a priori, only the internal addresses are known to the original multisite organization $O_0$, the external addresses not being known to the latter.

Consequently, and in accordance with one aspect of the method that is the object of the present invention, it is considered that the abovementioned internal and/or external addresses form, for the roaming terminal, a location reference relative to the original multisite organization $O_0$.

Thus, by way of nonlimiting example:

$$\{P@_{1si}\}_{i=1, s=1 \text{ to } H}^{i=I}$$

denotes the set of internal permanent addresses of one of the subnetworks allocated to the set of roaming terminals attached to the original home network supporting the original site $S_1$. This set is the set of the internal permanent addresses of the original link or original subnetwork, the set $\{P@_{1i}\}$ therefore refers to the set of addresses of the original site $S1$, all the subnetworks being combined;

$$-\{P@_{2j}\}_{j=1,}^{j=J} \{P@_{3k}\}_{k=1,}^{k=K} \{P@_{4l}\}_{l=1}^{l=L}$$

the set of internal temporary addresses allocated to the set of the abovementioned roaming terminals for any connection of one of these roaming terminals to another site affiliated to the original multisite organization $O_0$;

$$-\{P@_{pm}\}_{m=1}^{m=M}$$

the set of the external temporary addresses allocated by a multisite organization $O_p$ separate from the original multisite organization and for any site $S_p$ affiliated to this separate multisite organization;

$$-\{P@_{6n}\}_{n=1}^{n=N}$$

the set of the public addresses used by translation of the private addresses $P@_{pm}$.

Figure 3A:
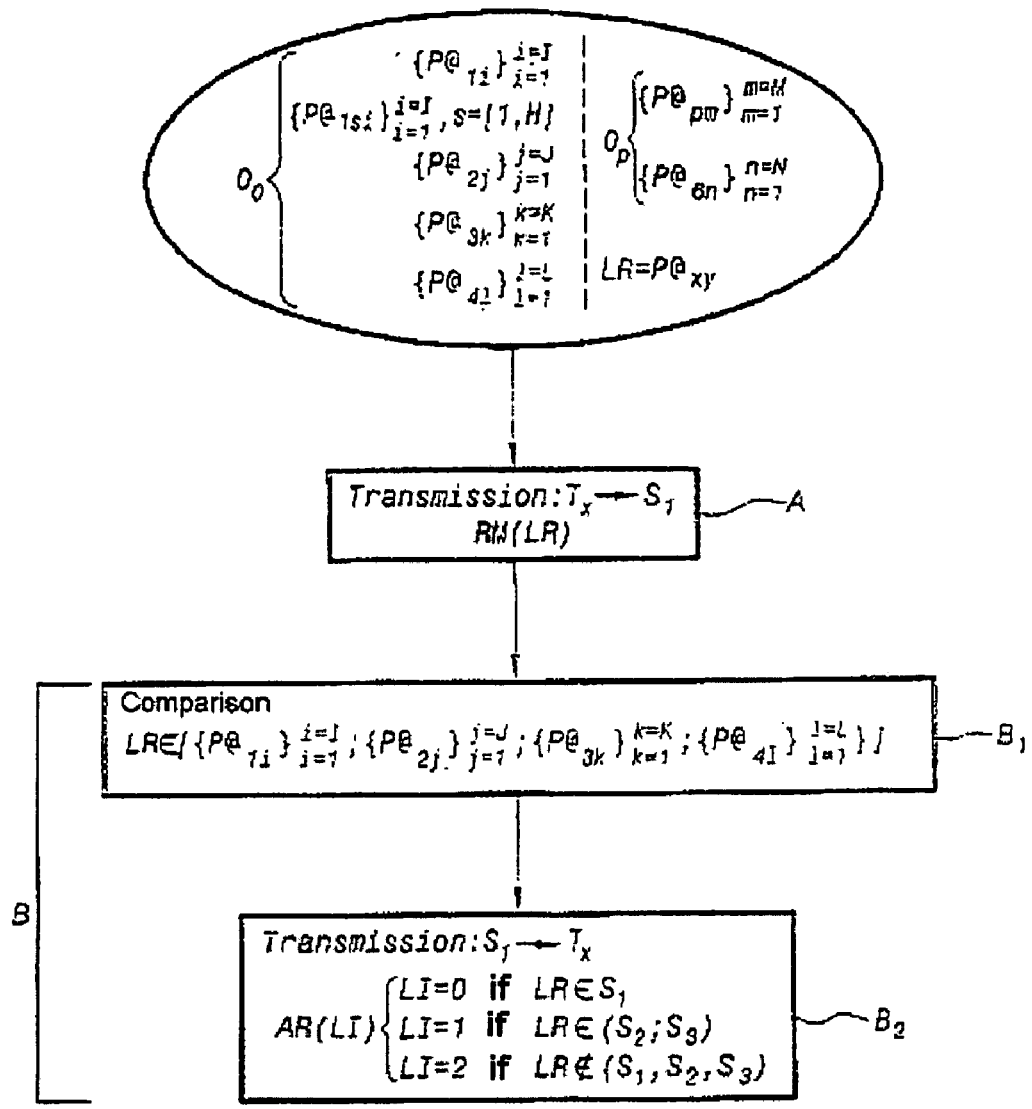
FIG. 3a represents, by way of illustration, a preferential nonlimiting flow diagram of a unique process for locating a roaming terminal with respect to its original site or its original organization, enabling the method that is the subject of the present invention to be implemented.

With reference to FIG. 3a, for any network connection of the abovementioned roaming terminal on a predetermined site, the unique location process that is the object of the invention consists in a step A in transmitting from the roaming terminal $T_1$, $T_2$, $T_3$ or $T_p$, to the original home network and ultimately to the site $S_1$ affiliated to the original multisite organization $O_0$, a registration message comprising at least the abovementioned location reference.

In FIG. 3a, the registration message is denoted:
RM (LR), in which LR designates the abovementioned location reference. It will be remembered that the location reference is formed by one of the addresses allocated to the roaming terminal on the move mentioned previously according to the situations represented in FIG. 1c.

The signaling message can be used to perform a registration of the connection of the roaming terminal.

In particular, in a nonlimiting but advantageous manner, it is indicated that the location reference LR can consist of a coded value, dependent on the address allocated. Given this assumption, this coded value can be obtained on the roaming computer, based on a specific bit-by-bit or other XOR coding function of the permanent address with a parameter-setting key, the reciprocal coding function and the parameter-setting key with which to restore the permanent address being known only to the server S of the original site $S_1$. The identity coding and reciprocal decoding functions are used, for example, to transmit only the original permanent address. To this end, the roaming terminal can perform a test, being able to compare the result of the coding of the location reference LR, by means of the coding function f, designated f(LR), and the result of this same coding function applied to the original permanent address $\{P@_{1si}\}$. The roaming terminal knowing only $f\{P@_{1si}\}$ proceeds to calculate f(LR) to be able to perform this comparison. The latter enables the roaming terminal to detect or not whether it is or is not connected to its original link on its original site $S_1$. The server S must proceed to decode the value resulting from the coding $RP@_{1si}=f\{P@_{1si}\}$ to retrieve the true fixed set $\{P@_{1si}\}_{i=1}^{i=I}$, s. Only the server S knows the inverse function $f^{-1}$, which, when applied to the coded value of the permanent address $f^{-1}(f \{P@_{1si}\})= \{P@_{1si}\}$ restores the latter. The server S can then compare the value of the location reference LR with $$\{P@_{1si}\}_{i=1,}^{i=I}$$

s=1 to H, to check that the terminal is on its original site.

The step A is then followed by a step $B_1$ consisting in comparing, for identification purposes, the location reference LR with the address values of at least one of the aforementioned sets formed by the set of internal permanent addresses allocated to the set of roaming terminals attached to the original home network and by the set of internal temporary addresses allocated to this set of roaming terminals for any connection to another site affiliated to the original multisite organization $O_0$.

In FIG. 3a, the comparison operation is symbolized by the relation:

$$LR \in \left[ \{P@_{1i}\}_{i=1}^{i=I}; \{P@_{2j}\}_{k=1}^{k=K}; \{P@_{3k}\}_{k=1}^{k=K}, \{P@_{4l}\}_{l=1}^{l=L} \right]$$

The comparison step $B_1$ is then followed by a step $B_2$ consisting in transmitting from the original home site $S_1$ to the roaming terminal, according to the position of the latter, a signaling response or acknowledgement message containing at least one location discriminating information item for the abovementioned roaming terminal.

In the step $B_2$, the registration acknowledgement message is denoted:
AR (LI).

For the abovementioned message, LI designates the location discriminating information item transmitted to the roaming terminal.

According to a noteworthy aspect of the method that is the subject of the invention, the location discriminating information item LI designates:
  either the connection of the roaming terminal to its original home network, that is, to its site $S_1$, on identification of the location reference LR in the set of internal permanent addresses;
  or the network connection of the roaming terminal to another site affiliated to the original multisite organization on identification of the location reference LR in the set of internal temporary addresses mentioned previously;
  or even the network connection of the roaming terminal to any site not affiliated to the original multisite organization, in the absence of identification of the location reference LR in one or other of the set of internal permanent addresses and the set of internal temporary addresses.

In FIG. 3a, in the abovementioned step $B_2$, the content of the location discriminating information item is represented by the relations:

$$LI=0 \text{ if } LR \in S_1;$$

$$LI=1 \text{ if } LR \in (S_2; S_3)$$

$$LI=2 \text{ if } LR \notin (S_1, S_2, S_3).$$

In the preceding relation, it is indicated that the relations concerning affiliation to the sites $S_1$, $S_2$ and $S_3$ are represented symbolically but executed by checking whether the location reference belongs to the set of addresses associated with each of the abovementioned sites as mentioned previously in the description.

It is also understood that the fact that the location reference LR does not belong is also obtained by checking the absence of identification of the location reference LR in all the sets of addresses associated with each of the sites $S_1$, $S_2$, $S_3$ affiliated to the original multisite organization.

Of course, in the symbolic relation given for the step $B_2$ in FIG. 3a, the values 0, 1 and 2 for the location information item LI are totally arbitrary.

Finally, in the step $B_2$ in FIG. 3a, $T_x$ in fact designates the roaming terminal in the position $T_1$, $T_2$, $T_3$ or $T_p$.

More specifically, it is indicated that the set of internal permanent addresses $$\{P@_{1i}\}_{i=1}^{i=I}$$

and the set of internal temporary addresses $$\{P@_{2j}\}_{j=1,}^{j=J} \{P@_{3k}\}_{k=1}^{k=K} \text{ and } \{P@_{4l}\}_{l=1}^{l=L}$$

are advantageously formed by separate sets of address values allocated by the original home network to the roaming terminal which in fact requests it on its network connection to one of the sites affiliated to the original multisite organization. This operation is, of course, performed under the control of the server S and of the network administrator responsible for the latter.

However, since the sets $$\{P@_{1i}\}_{i=1,}^{i=I} \{P@_{2j}\}_{j=1}^{j=J} \text{ and } \{P@_{4l}\}_{l=1}^{l=L}$$

are formed by separate sets of address values, the set $$\{P@_{3k}\}_{k=1}^{k=K}$$

can be a non-separate set, overlapping the sets $$\{p@_{1i}\}_{i=1}^{i=I} \text{ and } \{p@_{2j}\}_{j=1}^{j=J},$$

because the addresses of the set $$\{p@_{3k}\}_{k=1}^{k=K}$$

can be translated into addresses $$\{p@_{4l}\}_{l=1}^{l=L}.$$

It is furthermore indicated that the set of internal temporary addresses is formed either by predetermined address values, that is, by the subset $$\{p@_{2j}\}_{j=1}^{j=J} \text{ and } \{p@_{3k}\}_{k=1}^{k=K},$$

these predetermined address values possibly of course being arbitrary but contained within a specific address range determined by the network administrator or by address values calculated by translation. For example, the values of the subset $$\{p@_{4l}\}_{l=1}^{l=L}$$

are calculated from the address values forming the abovementioned internal permanent addresses by and under the authority of the original home network and of the network administrator.

Regarding the external temporary address allocated to the roaming terminal in position $T_p$ in FIG. 1c, for any network connection on any site $S_p$ not affiliated to the original multisite organization, it is indicated that such a temporary address can, for example, be formed by an address value calculated by translation from the permanent address allocated to the roaming terminal by the separate multisite organization $O_p$ under the authority of the administrator of the latter, but translated into a unique IP address on the INTERNET, before reaching the server S within the original multisite organization $O_0$, between the multisite organization $O_p$ and the INTERNET.

Figure 3B:
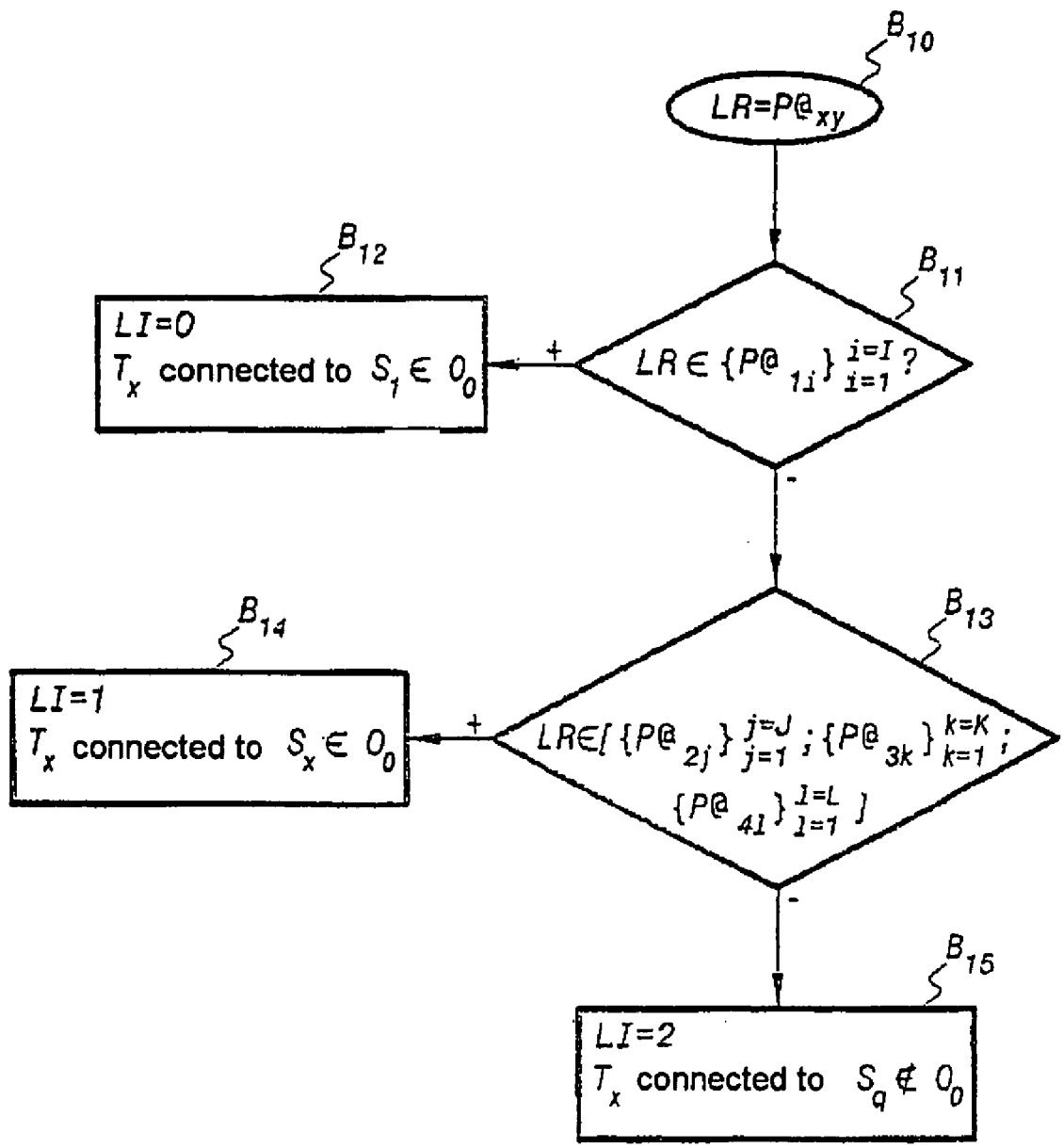

Regarding a specific implementation of the comparison step $B_1$ of FIG. 3a, it is indicated, by way of nonlimiting example, that such an implementation can consist of a succession of steps as represented in FIG. 3b.

In FIGS. 3a and 3b, the location reference LR is denoted $LR=P@_{xy}$, where x designates the situation reference of the roaming terminal and y an address allocated in this situation.

By way of nonlimiting example, the abovementioned steps can then include, in the context of the implementation of the step $B_1$, a step $B_{11}$ for testing whether the location reference belongs to the set of internal permanent addresses, a positive response to this test $B_{11}$ making it possible to conclude, in a step $B_{12}$, that the value is 0 for the location discriminating information item LI, the terminal $T_x$ being then connected to the original site $S_1$ affiliated to the multisite organization $O_0$.

On the other hand, on a negative response to the test $B_{11}$, a new test $B_{13}$ is invoked to compare the location reference LR to the set of internal temporary addresses as mentioned previously in the description.

On a positive response to the test $B_{13}$, the location information LI is allocated the value LI=1, the terminal $T_x$ thus being connected to a site $S_x$ separate from the original site $S_1$ but affiliated to the original multisite organization $O_0$.

On the other hand, on a negative response to the test $B_{13}$, then the location information LI is assigned the value 2, the roaming terminal $T_x$ being connected to any site $S_q$ not affiliated to the original multisite organization $O_0$.

The unique extended multicast information broadcast process, from a multicast information broadcast local to an original site to a roaming workstation user affiliated to this original site, to at least one separate site hosting this roaming workstation and linked to this original site by the IP network, in accordance with the subject of the present invention, will now be described in conjunction with FIGS. 4a and 4b.

Generally, it will be remembered that the local multicast information broadcast denoted $LMD_{1i}$ is generated from an information broadcasting source SD dedicated to a first local multicast information broadcast address in this original site $S_1$.

Figure 4A:
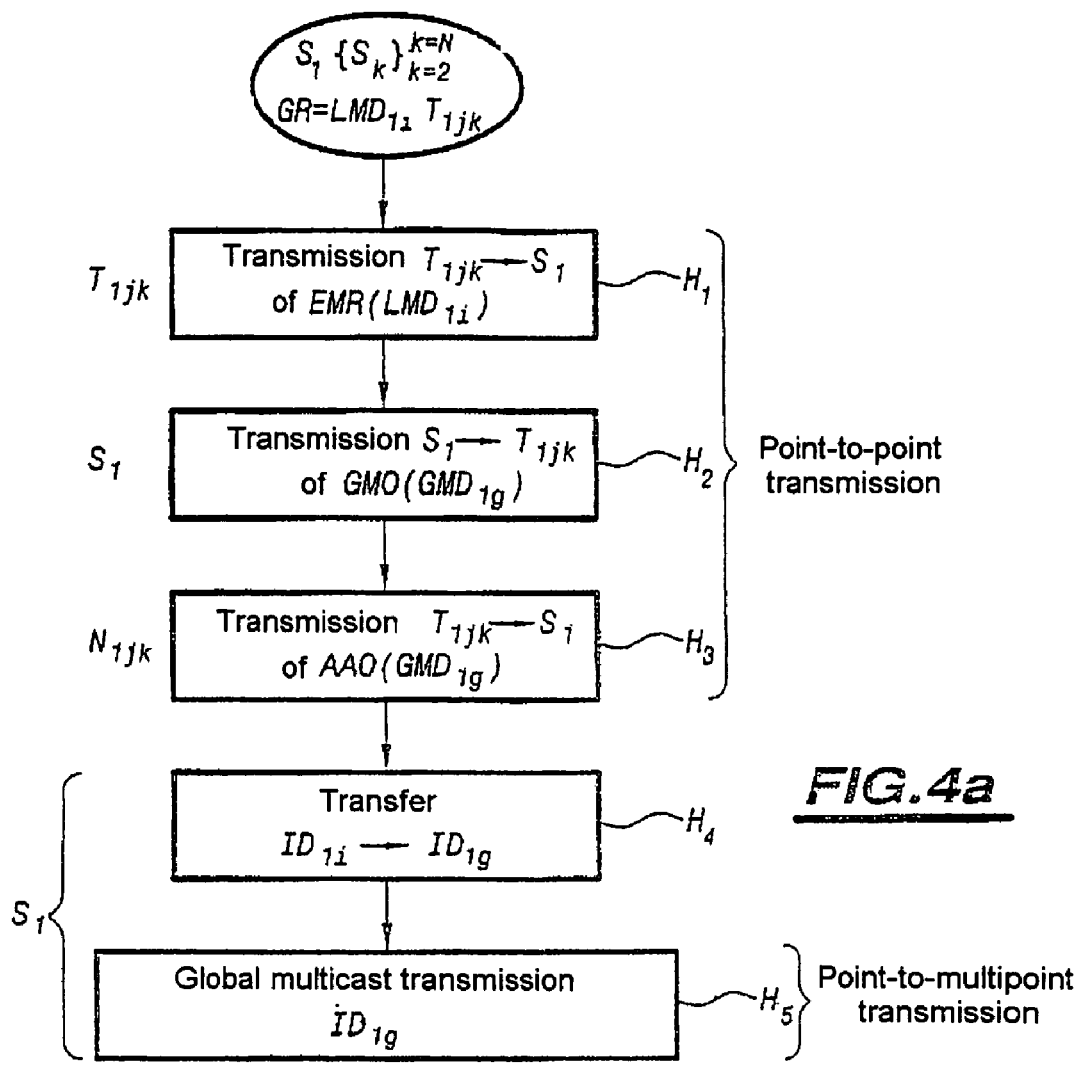
FIG. 4a represents, by way of illustration, a preferential flow diagram of a unique extended multicast transmission process enabling the method that is the subject of the present invention to be implemented.

With reference to FIG. 4a, the local multicast information broadcast is designated $LMD_{1i}$ in which the address references 1 and i represent the first local multicast information broadcast address in this original site, the reference 1 designating the address of the original site $S_1$ and the reference i designating the address of the local multicast information broadcast concerned in the abovementioned original site. The local multicast information broadcast can be compared to the first broadcast address.

Also considered is a set of separate sites $\{S_k\}$, k=2 to k=N, the original site $S_1$ and each of the sites $S_k$ forming the multisite entity or business mentioned previously in the description.

Finally, consideration is given to a roaming workstation denoted $T_{1jk}$, the index 1 indicating an affiliation reference of this roaming station to the original site $S_1$, the reference j denoting a reference or code identifying the roaming workstation concerned, the reference k denoting the connection of the roaming workstation concerned to the separate site $S_k$ hosting the latter and the link from the roaming workstation concerned to the original site via the IP network.

With reference to FIG. 4a, the unique extended multicast information broadcast process that is the object of the invention consists, via the interconnection of the roaming workstation to the IP network, in transmitting, in a step $H_1$, from the roaming workstation $T_{1jk}$ to the original site $S_1$, an extended multicast information broadcast request message, this request message being denoted EMR ($LMD_{1i}$).

As indicated in the step $H_1$ of FIG. 4a, the abovementioned request message contains at least the first local multicast information broadcast address $LMD_{1i}$, forming the group multicast broadcast address GR, and a code identifying the roaming workstation from, in particular, the indices 1 and references j and k of the roaming workstation concerned $T_{1jk}$.

Following the identification of the roaming workstation by the original site from the information contained in the request message, the extended multicast information broadcast process consists, in a step $H_2$, in transmitting from the original site $S_1$ to the roaming workstation $T_{1jk}$, a message offering access to a global multicast information broadcast, this access-offering message GMO($GMD_{1g}$) being denoted GMO ($GMD_{1g}$) in FIG. 4a. The abovementioned access-offering message includes at least one second global multicast information broadcast address $GMD_{1g}$, that is, the replacement address $GR_2$, the broadcasting source of which is identified in the original site.

With reference to FIG. 4a and the step $H_2$ in the latter, it will be understood that the second global multicast information broadcast address $GMD_{1g}$ includes the reference with the index 1 relating to the original site and the reference g to a global multicast broadcast address as defined specifically according to the RFC2365 standard mentioned previously in the description.

Following the receipt of the access-offering message GMO ($GMD_{1g}$) by the roaming workstation $T_{1jk}$, the extended multicast information broadcast process then consists, in a step $H_3$, in transmitting from the abovementioned roaming workstation to the original site $S_1$ via the IP network, a message accepting the offer of access to the information being broadcast at the second global multicast information broadcast address.

In the step $H_3$ of FIG. 4a, the message accepting the offer of access is denoted AAO ($GMD_{1g}$).

After receipt of the message accepting the offer of access AAO ($GMD_{1g}$) on the original site $S_1$, the extended multicast information broadcast process includes a step $H_4$ consisting in transferring information to be broadcast, stored at the first broadcast address and denoted for this reason $ID_{1i}$, to the second broadcast address. The information stored at the second broadcast address being denoted $ID_{1g}$.

By this simple operation, the information broadcast according to a local multicast information broadcast on the original site $S_1$ can then be broadcast according to an extended multicast information broadcast via the following step $H_5$ represented in FIG. 4a.

The abovementioned step $H_5$ then consists in transmitting, by global multicast broadcast, the information to be broadcast under the second address $ID_{1g}$. This enables the roaming workstation $T_{1jk}$ interconnected on the separate site to receive on the abovementioned separate site $S_k$ information being broadcast under the first local broadcast address then broadcast under the second global broadcast address.

With reference to the same FIG. 4a, it is indicated that the steps $H_1$, $H_2$ and $H_3$ represented in the latter, relating to the transmission between the roaming workstation $T_{1jk}$ and the original site $S_1$ of the extended IP multicast broadcast request message EMR ($LMD_{1i}$), of the message offering access to a global multicast broadcast GMO ($GMD_{1g}$) and of the message accepting the offer of access AAO ($GMD_{1g}$) are executed in point-to-point mode.

The use of this mode of transmission for the abovementioned steps is made possible by the communication of the respective addresses 1 of the original site, and k of the separate site concerned, the index j or address reference of the roaming workstation possibly then consisting of a code identifying the latter.

Conversely, and according to a noteworthy aspect of the method that is the object of the present invention, the step $H_5$ for global multicast transmission is performed in point-to-multipoint mode.

It will be understood, in these conditions, that the process of transmitting broadcast information under the second address, the global multicast transmission in the step $H_5$, is then comparable to that described in conjunction with FIG. 1a described previously in the description but that, however, the transmission of the information broadcast under the second global multicast broadcast address $ID_{1g}$ is no longer performed locally on only the original site but also on the separate site or sites of the multisite entity.

A particular embodiment of the step $H_4$ consisting in transferring the information to be broadcast from the first to the second broadcast address will now be described in conjunction with FIG. 4b.

The abovementioned embodiment concerns the particular and nonlimiting case in which the original site $S_1$ includes a broadcast server SD connected to the IP network via a router denoted $R_{11}$ for example. This particular case advantageously corresponds to the situation of a multisite business for which one of the original sites $S_1$ is provided with a broadcast server SD having a large number of clients, the use of a router in this situation being preferable.

Figure 4B:
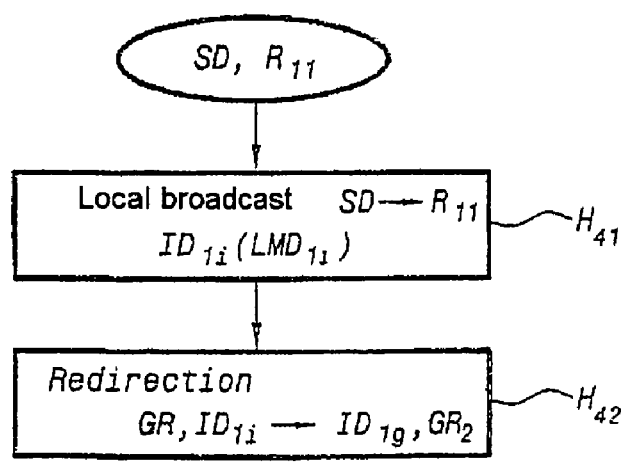
FIG. 4b represents, by way of illustration, an implementation detail of a process for transferring a multicast broadcast local to a site to a global broadcast or a broadcast local to the original organization.

With reference to FIG. 4b, it is indicated that the abovementioned step $H_4$ can then include a step $H_{41}$ for the local multicast broadcast, of information to be broadcast stored at the first address $LMD_{1i}$ of the broadcast server, to the router $R_{11}$.

The abovementioned step $H_{41}$ is followed by a step $H_{42}$ consisting of a step for redirecting the information to be broadcast $ID_{1i}$ by substituting the second global multicast broadcast address $GMD_{1g}$ or $GR_2$ for the first local broadcast address $LMD_{1i}$ forming the group multicast broadcast address GR. It will be understood, in particular, that this redirection step $H_{42}$ can simply consist in allocating the locally broadcast information $ID_{1i}$ the second global multicast broadcast address to in fact generate the data stored at the second broadcast address, denoting $ID_{1g}$.

It will be understood, in particular, that the abovementioned redirection step can simply consist in associating with the stored data supporting the information to be broadcast, stored on the router $R_{11}$, a simple data structure comprising the first and second addresses, the data structure possibly simply consisting of a list with at least the first and the second abovementioned addresses or any equivalent data structure.

Given the method of the extended multicast broadcast process as described in FIGS. 4a and 4b, it is indicated that, for a plurality of extended multicast broadcast request messages, relating to one and the same first local multicast broadcast address, emanating from a plurality of roaming workstations affiliated to the original site and each interconnected to the IP network on a different separate site, the step $H_5$ consisting in transmitting by global multicast broadcast the information to be broadcast under the second address then allows for the creation of a global multicast broadcast tree, the root element of which is formed by one of the routers common to the broadcast branches that make up the abovementioned global multicast broadcast tree.

However, a specific embodiment of the extended multicast broadcast process can be envisaged, this embodiment appearing particularly advantageous for a coherent management of the local, or global, multicast information broadcasting types, and of the memory space ultimately occupied to this end, both on the broadcast server SD and on the router $R_{11}$.

According to the abovementioned particularly advantageous embodiment, the second global multicast broadcast address $GMD_{1g}$ can be maintained and validated for a permanent local multicast information broadcast $LMD_{1i}$ at the first address. The concept of permanent information broadcast is extended to maintaining the global address as long as there are external subscribers.

In these conditions, it will be understood that, to permanently maintain and validate the second global multicast information broadcast address $GMD_{1g}$, the data structure, such as a list [$LMD_{1i}$, $GM_{1g}$], is stored and secured permanently on the router, the first and second addresses thus being mapped on a one-to-one basis permanently.

In these conditions, the step $H_4$ consisting in transferring information to be broadcast from the first to the second broadcast address can then be eliminated for any extended multicast broadcast request message to this second address, subsequent to the first extended IP multicast broadcast request message to the abovementioned second address.

It will be understood, in particular, that the idea of eliminating the step $H_4$ simply concerns eliminating the physical transfer of the data stored at the first address to the second address, in which case this physical transfer can possibly then simply be replaced by calling the second global multicast information broadcast address from the permanent data structure mentioned previously.

For a more detailed description of the unique process for discriminating the connection site in relation to the original site and/or original multisite organization, or of the unique extended global multicast broadcast process, it may be useful to refer to the French patent applications FR 03 09873 and FR 03 12688 filed previously, respectively on Aug. 12, 2003 and Oct. 29, 2003, in the name of the applicant.

A more detailed description of a system of multicast broadcasting to a roaming terminal according to the location of the IP network connection of this terminal, in accordance with the subject of the present invention, will now be given in conjunction with FIG. 5.

Figure 5:
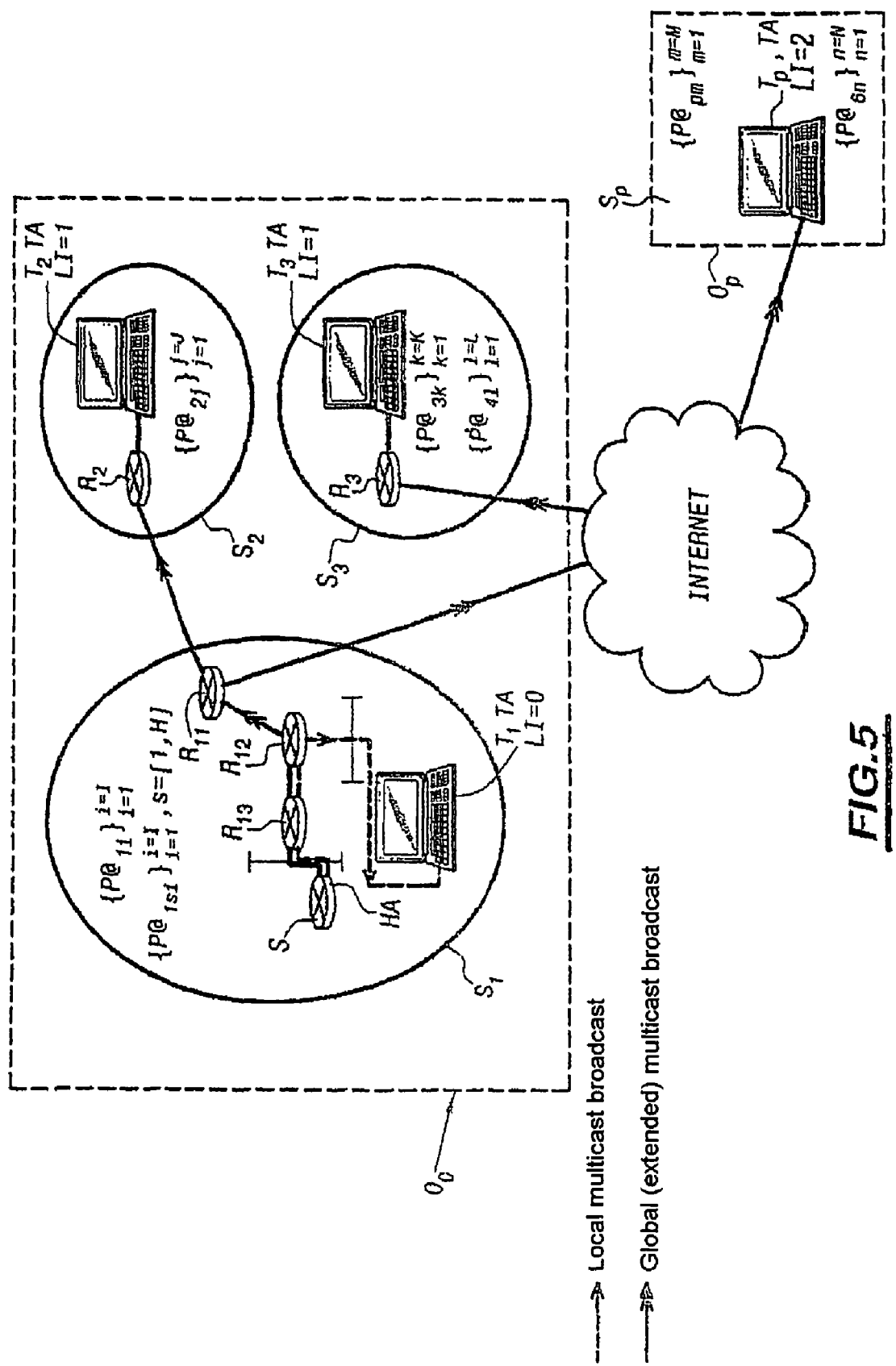
FIG. 5 represents, by way of illustration, a diagram of a system of multicast broadcasting to a roaming terminal according to its location, in accordance with the subject of the present invention.

In FIG. 5, the same notations designate the same elements as in the preceding figures.

As is shown in the abovementioned FIG. 5, the system that is the subject of the invention comprises, at least on the original site $S_1$, a module for discriminating the location of the roaming terminal $T_x$ with x=1, 2, 3, p in FIG. 5 with respect to its original site $S_1$ and/or its original organization $O_0$, from the signaling message as described previously in the description in conjunction with FIG. 2a.

In FIG. 5, the discrimination module bears the reference HA and can be installed on the server S associated with the original home network of the roaming terminal concerned.

Of course, the system that is the object of the invention also includes a transmission module installed on the original site $S_1$, this transmission module being used to handle the transmission to the roaming terminal $T_x$ of an information location discriminating information item LI described previously in the description.

The transmission module is not represented explicitly in FIG. 5 because the server S is, of course, conventionally provided with any module for transmitting messages to the terminals, in particular the roaming terminals, under its responsibility.

Finally, the system that is the subject of the invention includes, on the roaming terminal referenced $T_x$ and regardless of the position of the latter x=1, 2, 3, p, and for any request to access a group multicast broadcast intended for the original site $S_1$ and relating to a multicast broadcast local to the original site, or to the original organization $S_1$, $O_0$ of this roaming terminal, a module for replacing this access request with a request to access an extended multicast broadcast, allowing access to the abovementioned local multicast broadcast, when the location discriminating information item LI of the roaming terminal concerned designates a connection of the latter outside its original site $S_1$ or its original organization $O_0$.

In FIG. 5, the replacement module is denoted TA, this module, of course, being installed on the roaming terminal regardless of the connection position of the latter.

With regard to the discrimination module HA installed on the server S of the original site $S_1$, it is indicated that this discrimination module advantageously includes a database module including a first set of internal permanent addresses allocated by the original home network or the original site $S_1$ to the set of roaming terminals attached to this original home network, and a second set of internal temporary addresses likely to be allocated to the set of roaming terminals for any connection to another site affiliated to this original organization. The abovementioned sets are, of course, represented in FIG. 3a.

The discrimination module further includes a comparison module for identifying the location reference LR with the address values of at least one of the first and second abovementioned sets, that is, with the internal permanent, or internal temporary, addresses mentioned previously.

The transmission module can then be used to transmit from the original home network to the roaming terminal, a signaling acknowledgement message containing the location discriminating information item LI. This information item designates either the connection of the roaming terminal concerned $T_x$ on its original home network or its original home site $S_1$ on identification of the location reference LR in the first set of internal permanent addresses, or the network connection of the roaming terminal $T_x$ on another site affiliated to the original multisite organization, the sites $S_2$ or $S_3$ in FIG. 5, on identification of the location reference in the second set of internal temporary addresses, or even the network connection of the roaming terminal on any site with the terminal in position $T_p$ when this site $S_p$ is not affiliated to the original multisite organization in the absence of identification of the location reference in one or other of the first and second sets of internal permanent, or internal temporary, addresses, mentioned previously.

FIG. 5 thus shows the roaming terminal $T_x$ in the position of connection on its original site $S_1$, the location information LI being equal to 0 in the example mentioned previously in the description, the roaming terminal connected to the site $S_2$ or the site $S_3$ separate from the original site $S_1$, but affiliated to the original organization $O_0$, the location information LI having the value 1 in this situation and, finally, the roaming terminal connected to any site $S_p$ affiliated to any organization $O_p$ separate from the original organization $O_0$, the location information LI in this situation having the value 2 as mentioned previously in the description.

Of course, and in a particularly advantageous and nonlimiting manner, the module for discriminating the location of the roaming terminal concerned, the module denoted HA in FIG. 5, is formed by a software agent installed on the original site $S_1$ of the roaming terminal. It can in particular be installed on the server S mentioned previously.

Similarly, with regard to the module for replacing the access request formulated by the roaming terminal $T_x$, it is indicated that this replacement module denoted TA advantageously includes a module for discriminating the class of the multicast broadcast address requested with respect to the multicast broadcast classes that are global, or local, to the original site and/or organization $S_1$ and $O_0$ of the roaming terminal concerned.

It also includes a module for discriminating the value of the location discriminating information item LI that the roaming terminal has after connection and transmission by the server S installed on the original site $S_1$ to which the roaming terminal concerned is attached.

The module for discriminating the class of the multicast broadcast address requested with respect to the global and/or local multicast broadcast classes and the module for discriminating the value of the location discriminating information item of this roaming terminal are advantageously formed by a software agent denoted TA and associated with the roaming terminal concerned, this software agent being installed on the abovementioned roaming terminal and, of course, executable by the latter.

The process of execution by the software agent TA concerned corresponds to that described in conjunction with FIGS. 3a and 3b.

Finally, it is indicated that the method and system of multicast broadcasting to a roaming terminal according to the location and IP network connection of the latter according to the object of the present invention are advantageously implemented from a software product stored on a storage medium, this software product being, of course, executed by a computer.

The software product is used to install and run the software agent HA on the server S of the original site $S_1$ and, in particular, the set of operations and steps represented in FIGS. 2a, 3a and 3b previously described in the description.

The method and system that are the object of the present invention are also advantageously implemented from a software product for installing and executing the software agent TA installed on each roaming terminal in accordance with the execution process as represented in FIGS. 2a, 2b and 4a, 4b, described previously in the description.

The invention claimed is:

1. A method of multicast broadcasting to a roaming terminal according to a location of an IP network connection of the roaming terminal, wherein, following a routine connection of the roaming terminal to at least one of a site affiliated or not affiliated to an original site and an original organization to which the roaming terminal is attached and transmission of a signaling message from the roaming terminal to said original site, said method comprises at least:
on said original site,
discriminating the location of said roaming terminal with respect to the original site, or the original organization, from said signaling message,
transmitting to said roaming terminal a location discriminating information item; and
on said roaming terminal,
determining whether an access request from the roaming terminal to access a group multicast broadcast relates to a group multicast broadcast intended for and local to the original site, or to the original organization, of said roaming terminal, by discriminating the address of the access request to determine whether the address is a global address, an address local to the organization or an address local to the original site and
upon determining that
the roaming terminal is outside its original site or its original organization, and that
the request to access a group multicast broadcast is intended for the original site and relating to a multicast broadcast local to the original site, or to the original organization, of said roaming terminal,
replacing said access request with a request to access an extended multicast broadcast allowing access to said local multicast broadcast;
transmitting, to said original site, said request to access said extended multicast broadcast,
otherwise, transmitting the access request to access the group multicast broadcast to the original site.

2. The method as claimed in claim 1, wherein, for a roaming terminal configured to operate at least one of inside and outside an original home network, said roaming terminal being allocated, by said original site, an internal permanent address for any network connection of the roaming terminal to a site affiliated to the original home network, an internal temporary address for any network connection of the roaming terminal to another site, affiliated to said original organization, and, for any site not affiliated to said original organization, an external temporary address for any network connection of said roaming terminal to said any site, said addresses forming, for said terminal, a location reference, said step of discriminating the location of said roaming terminal with respect to the original site, or the original organization, comprises at least:
transmitting from said roaming terminal to said original home network, said signaling message including at least said location reference;
comparing, for identification, said location reference with address values of at least one of sets formed by a set of internal permanent addresses allocated to a set of roaming terminals attached to the original home network and configured to operate in the original home network and by a set of internal temporary addresses allocated to the set of roaming terminals for any connection to another site affiliated to said original organization; and
transmitting from the original home site to said roaming terminal a signaling acknowledgement message containing at least said location discriminating information item of the roaming terminal designating either the connection of said roaming terminal to the original home network on identification of said location reference in the set of internal temporary addresses, or a network connection of said roaming terminal to another site affiliated to said original organization on identification of said location reference in the set of internal temporary addresses, or a network connection of said roaming terminal to any site not affiliated to said original organization, in the absence of identification of said location reference in either the set of internal permanent addresses or the set of internal temporary addresses.

3. The method as claimed in claim 1, wherein said step of replacing said access request with a request to access an extended multicast broadcast comprises at least:
discriminating a class of multicast broadcast address requested with respect to multicast broadcast classes that are global, or local, to the original site, or to the original organization; and
transmitting a request to access said requested multicast broadcast address on discrimination of a requested multicast broadcast address belonging to the global broadcast address class; otherwise
transmitting a request to access said requested multicast broadcast address on discrimination of a requested multicast broadcast address belonging to at least one of the class of multicast broadcast addresses local to said original organization and the original site, to which said roaming terminal is affiliated, according to said location discriminating information item,
when said roaming terminal is connected to a site affiliated to the original organization, and when said requested broadcast address is an address global to the original organization, or,
when said roaming terminal is connected to the original home site and when said requested broadcast address is an address local to said original home site; otherwise
transmitting a request to access an extended multicast broadcast from a local multicast information broadcast, said request to access an extended multicast broadcast being used, from the original home site, to assign and transmit to said roaming terminal another global multicast broadcast address, under which said local multicast broadcast can be accessed on the site to which said terminal is connected, when said roaming terminal is connected to a site separate from the original home site, but when the requested broadcast address is local to said original home site, or when said roaming terminal is connected to a site not affiliated to the original organization, but when said requested broadcast address is a local address to said original organization; and transmitting from said roaming terminal to said original home site of the roaming terminal an access request including said other global multicast broadcast address.

4. The method as claimed in claim 1, wherein the step of transmitting a request to access an extended multicast broadcast from a multicast information broadcast that is local to the original organization, or to the original site, of said roaming terminal, the local multicast information broadcast being generated by an information broadcasting source located at a first local multicast information broadcast address in the original site, comprises in:

transmitting, from said roaming terminal to said original site, an extended multicast information broadcast request message, said request message containing at least said first local multicast information broadcast address and an identification code of said roaming terminal; and, following the identification of said roaming terminal by said original site, transmitting, from said original site to said roaming workstation, a message offering access to a global multicast information broadcast, said message offering access comprising at least one second global multicast information broadcast address, the broadcasting source of which is identified in said original site; and, following the receipt of said message offering access by said roaming terminal, transmitting from the roaming terminal to said original site, a message accepting the offer of access to the information being broadcast at said second global multicast information broadcast address; and, after receipt of the message accepting the offer of access at said original site, transferring the information to be broadcast from the first to the second broadcast address; and transmitting, by global multicast broadcast, the information to be broadcast under the second address, which enables said roaming terminal interconnected to a site not affiliated to said original site, or to said original organization, to receive, on said site, said information being broadcast under the first local broadcast address, broadcast under the second global broadcast address.

5. A non-transitory computer-readable storage medium with an executable program stored thereon, wherein the program instructs a microprocessor to implement the method as claimed in claim 1, when executed by a computer comprising said microprocessor and located on the original site of the roaming terminal, enabling the location of the roaming terminal to be discriminated with respect to the original site, or the original organization, from the signaling message.

6. A system of multicast broadcasting to a roaming terminal according to a location of an IP network connection of the roaming terminal, following a routine connection of the roaming terminal to at least one of a site affiliated or not affiliated to an original site and an original organization to which the roaming terminal is attached and transmission of a signaling message from the roaming terminal to the original site, the system comprising:

on said original site, means of discriminating the location of the roaming terminal with respect to the original site, or the original organization, from the signaling message, and means of transmitting to the roaming terminal a location discriminating information item; and on the roaming terminal, means for determining from the said location discriminating item whether the roaming terminal is outside its original site or its original organization;

means for determining whether an access request from the roaming terminal to access a group multicast broadcast relates to a group multicast broadcast intended for and local to the original site, or to the original organization, of said roaming terminal, by discriminating the address of the access request to determine whether the address is a global address, an address local to the organization or an address local to the original site;

means of replacing the access request with a request to access an extended multicast broadcast allowing access to the local multicast broadcast, when the location discriminating information item designates a connection of the roaming terminal outside the original site, or the original organization, and the means for determining whether an access request from the roaming terminal to access a group multicast broadcast relates to a group multicast broadcast intended for and local to the original site, or to the original organization, of the roaming terminal determines that the request to access a group multicast broadcast is intended for the original site and relates to a multicast broadcast local to the original site, or to the original organization, of said roaming terminal, and means of transmitting to the original site said request to access the extended multicast broadcast, or alternatively said access request to access a group multicast broadcast.

7. The system as claimed in claim 6, wherein said discrimination means are formed by at least:

a database comprising at least a first set of internal permanent addresses allocated, by an original home network, to a set of roaming terminals attached to the original home network, and a second set of internal temporary addresses configured to be allocated to the set of roaming terminals, for any connection to another site affiliated to the original organization;

means of comparing, for identification purposes, said location reference with the address values of at least one of the first and second sets of internal permanent, or internal temporary, addresses; and means of transmitting, from said original home network to the roaming terminal, a signaling acknowledgement message containing at least one location discriminating information item designating either the connection of the roaming terminal to the original home network on identification of a location reference in the first set of internal permanent addresses, or a network connection of the roaming terminal to another site affiliated to the original organization on identification of the location reference in the second set of internal temporary addresses, or a network connection of the roaming terminal to any site not affiliated to the original multisite organization in the absence of identification of the location reference in either of the first and second sets of internal permanent, or internal temporary, addresses.

8. The system as claimed in claim 6, wherein said means of replacing the access request include at least:
means of discriminating a class of multicast broadcast address requested with respect to multicast broadcast classes that are global, or local, to the original site, or to the original organization, and
means of discriminating a value of the location discriminating information item of the roaming terminal.

9. The system as claimed in claim 6, wherein said location discriminating means of the roaming terminal are formed by a software agent located on the original site of said roaming terminal.

10. The system as claimed in claim 6, wherein said replacement means are formed by a software agent located on the roaming terminal and executable by the the roaming terminal.

11. A non-transitory computer-readable storage medium with an executable program stored thereon, wherein the program instructs a microprocessor to implement the method as claimed in claim 6, when executed by a roaming computer comprising said microprocessor and connected outside the original site, or the original organization, being used to replace any request from the roaming terminal to access a multicast broadcast local to the original site, or to the original organization, of the roaming terminal, with a request to access an extended multicast broadcast enabling access to the local multicast broadcast.

12. A roaming terminal, comprising:
communication means configured for setting up a connection with an original site to which said roaming terminal is attached,
synchronization means configured for transmitting a synchronization message to the original site,
means of receiving a location discriminating information item sent in return by the original site, the means of receiving being connected to means of accessing a group multicast broadcast local to the original site; and
means for determining whether an access request from the roaming terminal to access a group multicast broadcast relates to a group multicast broadcast intended for and local to the original site, or to the original organization, of said roaming terminal, by discriminating the address of the access request to determine whether the address is a global address, an address local to the organization or an address local to the original site,
wherein the means of accessing a group multicast broadcast local to the original site is configured for converting a request to access a local multicast broadcast into a request to access an extended multicast broadcast enabling access to the local multicast broadcast when
1 the location discriminating information item designates a connection of the roaming terminal outside the original site; and
2 the means for determining whether an access request from the roaming terminal to access a group multicast broadcast relates to a group multicast broadcast intended for and local to the original site, or to the original organization, of said roaming terminal determines that the request to access a group multicast broadcast is intended for the original site and relates to a multicast broadcast local to the original site, or to the original organization, of said roaming terminal,
the terminal further comprising means of transmitting to the original site said request to access the extended multicast broadcast, or alternatively said access request to access a group multicast broadcast.

* * * * *